United States Patent
Luo

(10) Patent No.: US 8,576,791 B2
(45) Date of Patent: Nov. 5, 2013

(54) SHARING CONTROL CHANNEL RESOURCES

(75) Inventor: Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 226 days.

(21) Appl. No.: 13/083,477

(22) Filed: Apr. 8, 2011

(65) Prior Publication Data

US 2011/0261768 A1    Oct. 27, 2011

Related U.S. Application Data

(60) Provisional application No. 61/328,412, filed on Apr. 27, 2010.

(51) Int. Cl.
*H04W 4/00* (2009.01)

(52) U.S. Cl.
USPC ........................................ 370/329; 370/437

(58) Field of Classification Search
None
See application file for complete search history.

(56) References Cited

U.S. PATENT DOCUMENTS

2009/0088148 A1 * 4/2009 Chung et al. ................. 455/423

FOREIGN PATENT DOCUMENTS

EP      2207270 A1 *  7/2010  ............ H04W 72/04
WO   2009116754 A2     9/2009

OTHER PUBLICATIONS

Nishio et al. WO 2009/057283 A1, May 7, 2009.*
Catt: "PDCCH search space", 3GPP Draft; R1-082967, 3RD Generation Partnership Project (3GPP), Mobile Competence Centre; 650, Route Des Lucioles; F-06921 Sophia-Antipolis Cedex; France, No. Jeju; 20080812, XP050316432, [retrieved on Aug. 12, 2008].
International Search Report and Written Opinion—PCT/US2011/034093, International Search Authority—European Patent Office—Aug. 18, 2011.

* cited by examiner

*Primary Examiner* — Otis L Thompson, Jr.
*Assistant Examiner* — Jenkey Van
(74) *Attorney, Agent, or Firm* — Larry J. Moskowitz

(57) ABSTRACT

A method for reusing control channel resources in a wireless system includes selecting a subset of control channel resources from a specified set of control channel resources in a search space of the wireless system. The subset is smaller than the set. In addition, the method includes transmitting a first control channel using only the subset of control channel resources. Further, the method includes selecting at least one of the control channel resources not transmitted in the first control channel. Furthermore, the method includes transmitting a different control channel using at least one of the control channel resources specified for but not scheduled in the first control channel.

51 Claims, 10 Drawing Sheets

SHARING CONTROL CHANNEL RESOURCES

CROSS-REFERENCE TO RELATED APPLICATION

This application claims the benefit under 35 U.S.C. §119(e) to U.S. Provisional Patent Application No. 61/328,412 entitled "Method For Sharing Control Channel Resources in LTE and LTE-A", filed on Apr. 27, 2010, the disclosure of which is expressly incorporated by reference herein in its entirety.

BACKGROUND

1. Field

Aspects of the present disclosure relate generally to wireless communication systems, and more particularly to a method for sharing control channel resources in advanced wireless communication systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier TDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method for reusing control channel resources in a wireless system includes selecting a subset of control channel resources from a specified set of control channel resources in a search space of the wireless system. The subset is smaller than the set. The method may also include transmitting a first control channel using only the subset of control channel resources and selecting at least one of the control channel resources not transmitted in the first control channel. The method may include selecting at least one of the control channel resources that were specified for but not used in the first control channel. Further, the method may include transmitting a different control channel using at least one of the control channel resources specified for but not scheduled in the first control channel.

According to some aspects of the disclosure, a method for reusing control channel resources in a wireless system includes receiving an indication of a subset of control channel resources that is smaller than a specified set of control channel resources of a control channel to be transmitted in a search space of the wireless system. The method may also include decoding the control channel transmitted with only the subset of control channel resources, in accordance with the indication.

According to some aspects of the disclosure, an apparatus for reusing control channel resources in a wireless system includes a means for selecting a subset of control channel resources from a specified set of control channel resources in a search space of the wireless system. The subset is smaller than the set. The apparatus may also include means for transmitting a first control channel using only the subset of control channel resources and means for selecting at least one of the control channel resources not transmitted in the first control channel. The apparatus may include means for selecting at least one of the control channel resources that were specified for but not used in the first control channel. Further, the apparatus may include means for transmitting a different control channel using at least one of the control channel resources specified for but not scheduled in the first control channel.

According to some aspects of the disclosure, an apparatus for reusing control channel resources in a wireless system includes means for receiving an indication of a subset of control channel resources that is smaller than a specified set of control channel resources of a control channel to be transmitted in a search space of the wireless system. The apparatus may also include means for decoding the control channel transmitted with only the subset of control channel resources, in accordance with the indication.

According to some aspects of the disclosure, a computer program product for reusing control channel resources in a wireless system includes a computer-readable medium having a program code recorded thereon. The program code includes program code to select a subset of control channel resources from a specified set of control channel resources in a search space of the wireless system where the subset is smaller than the set. The program code may also include program code to transmit a first control channel using only the subset of control channel resources and program code to select at least one of the control channel resources not transmitted in the first control channel. The program code may include program code to select at least one of the control channel resources that were specified for but not used in the first control channel. Further, the program code may include program code to transmit a different control channel using at least one of the control channel resources specified for but not scheduled in the first control channel.

According to some aspects of the disclosure, a computer program product for reusing control channel resources in a wireless system includes a computer-readable medium having a program code recorded thereon. The program code includes program code to receive an indication of a subset of control channel resources that is smaller than a specified set of control channel resources of a control channel to be transmitted in a search space of the wireless system. The program code may also include program code to decode the control channel transmitted with only the subset of control channel resources, in accordance with the indication.

According to some aspects of the disclosure, an apparatus for reusing control channel resources in a wireless system includes a memory and at least one processor coupled to the memory. The at least one processor is configured to select a subset of control channel resources from a specified set of control channel resources in a search space of the wireless system where the subset is smaller than the set. The at least one processor may also be configured to transmit a first control channel using only the subset of control channel resources and to select at least one of the control channel resources not transmitted in the first control channel. The at least one processor may be configured to select at least one of the control channel resources that were specified for but not used in the first control channel. Further, the at least one processor may be configured to transmit a different control channel using at least one of the control channel resources specified for but not scheduled in the first control channel.

According to some aspects of the disclosure, an apparatus for reusing control channel resources in a wireless system includes a memory and at least one processor coupled to the memory. The at least one processor is configured to receive an indication of a subset of control channel resources that is smaller than a specified set of control channel resources of a control channel to be transmitted in a search space of the wireless system. The at least one processor may also be configured to decode the control channel transmitted with only the subset of control channel resources, in accordance with the indication.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
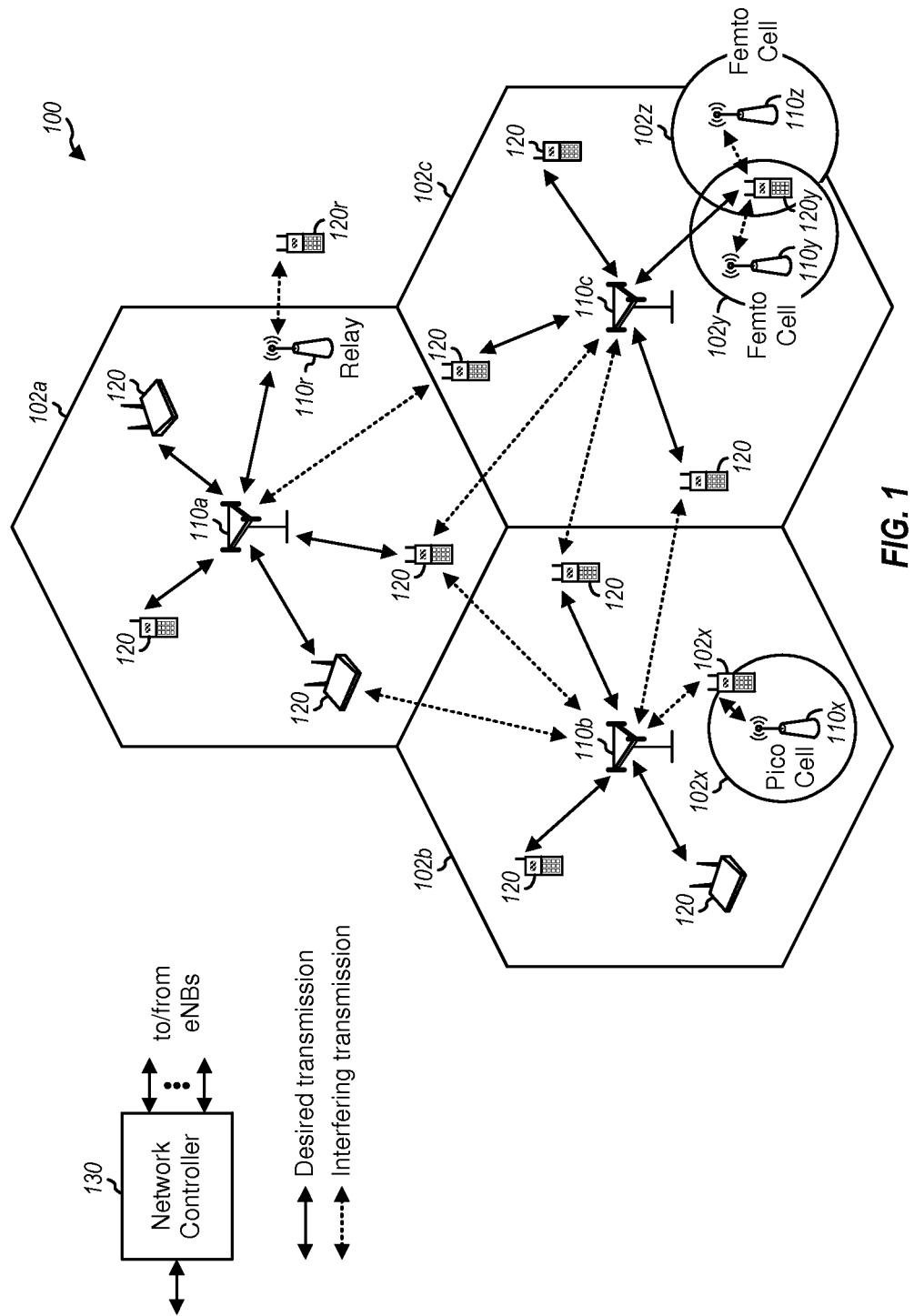
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous and/or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) and/or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.4, 3, 5, 10, 15 or 20 MHz, respectively.

Figure 2:
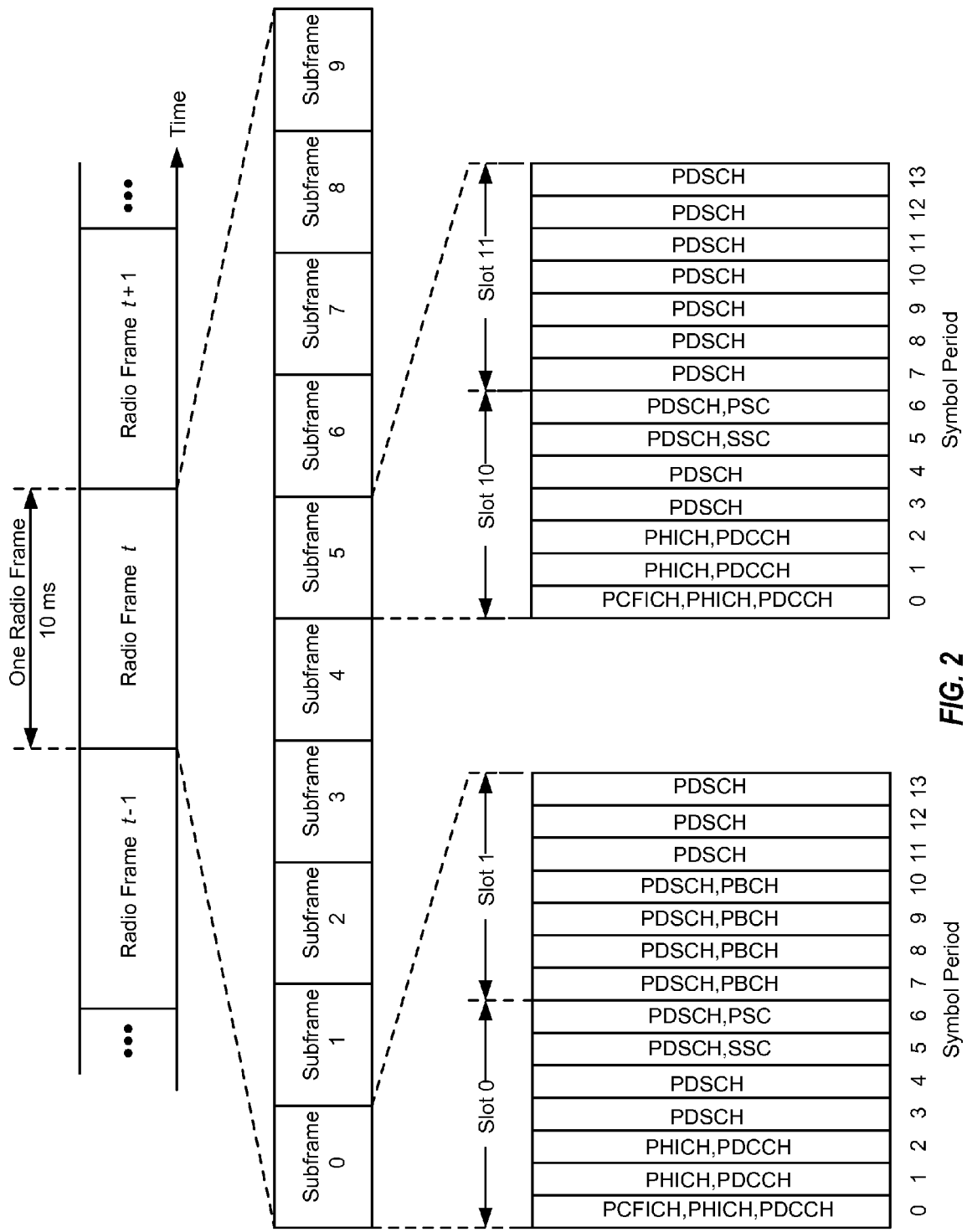
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
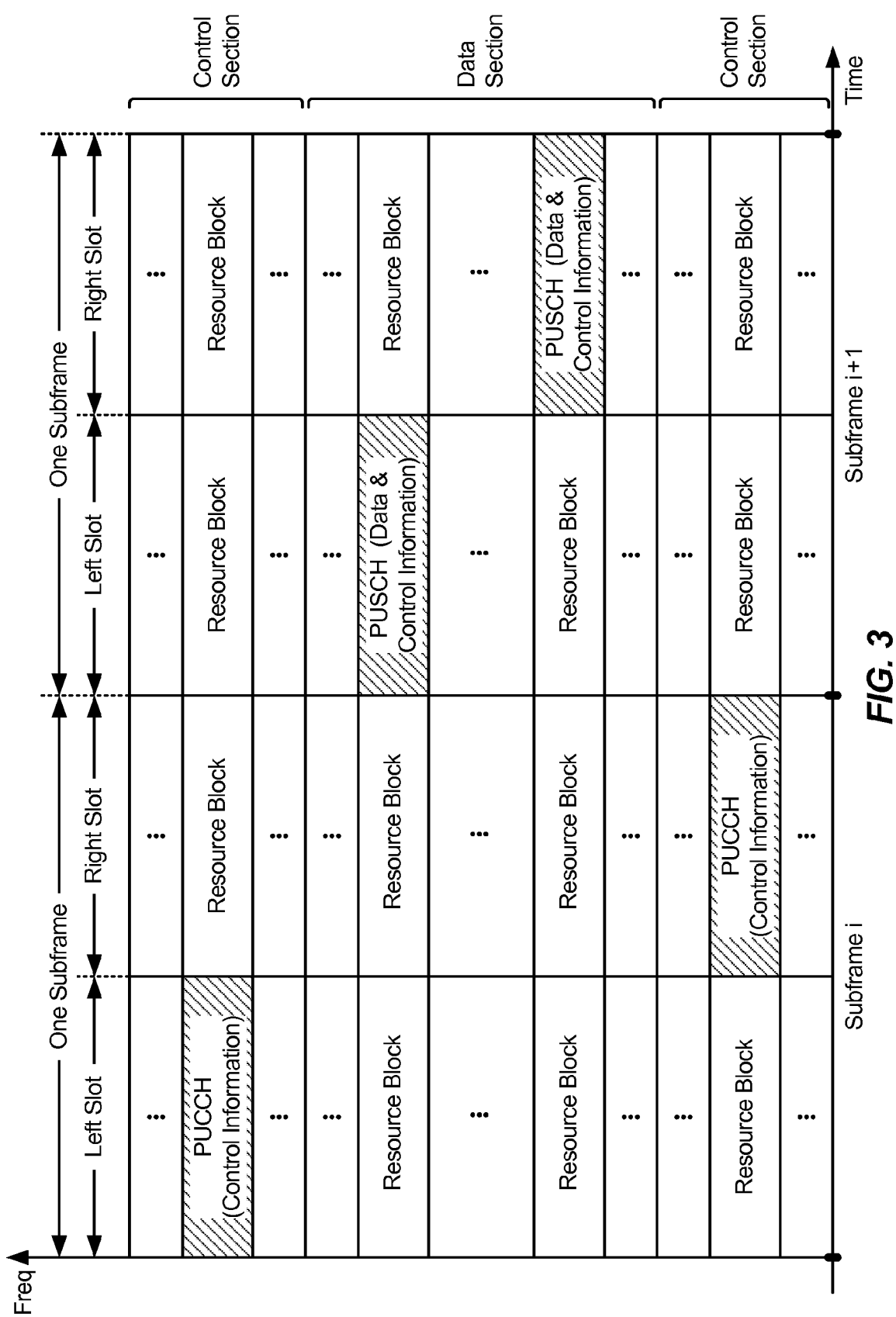
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PB CH, PUCCH, PUSCH, and other such signals and channels used in LTE/-A are described in 3GPP TS 36.211, entitled "Evolved Universal Terrestrial Radio Access (E-UTRA); Physical Channels and Modulation", which is publicly available.

Figure 4:
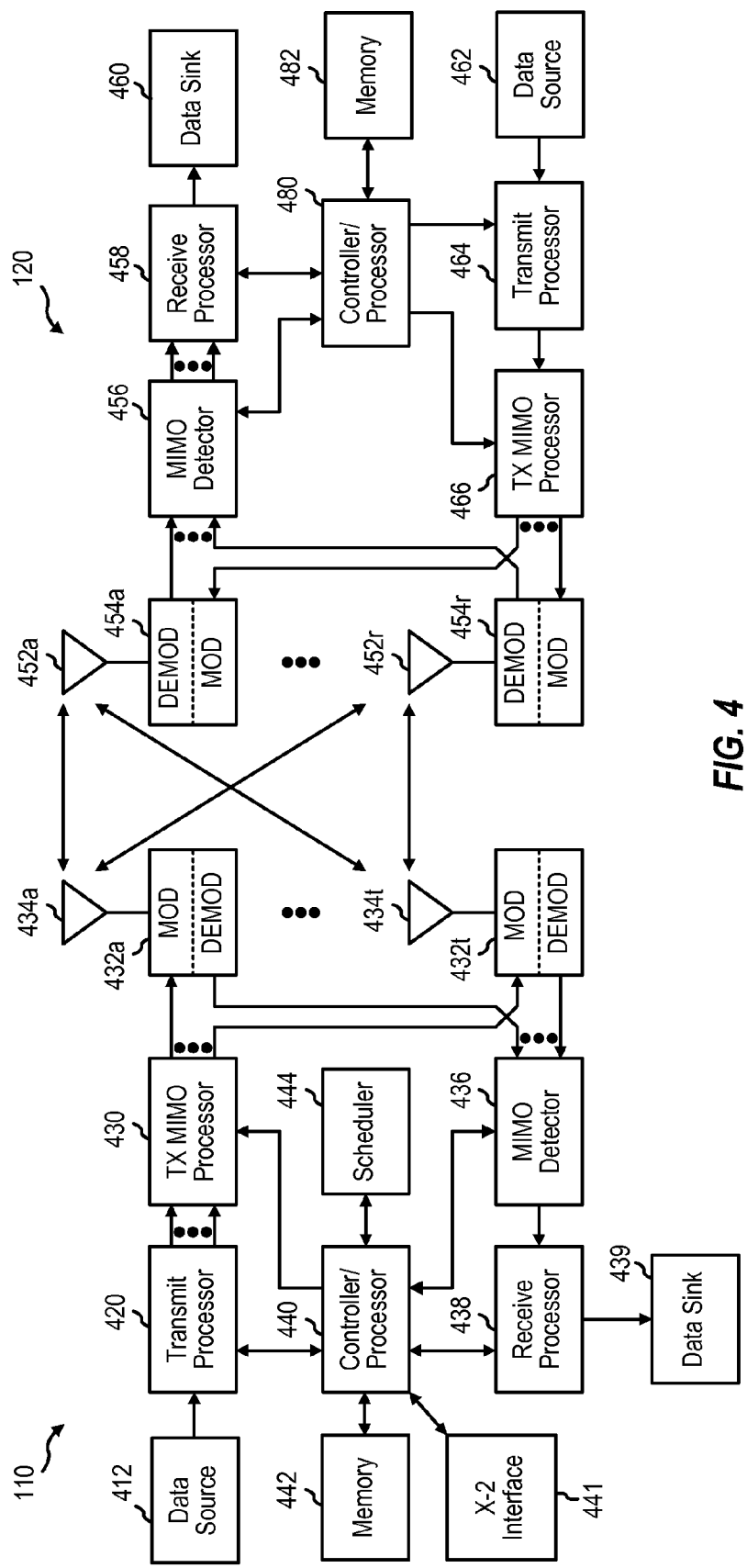
FIG. 4 is a block diagram conceptually illustrating a design of a base station/eNodeB and a UE configured according to one aspect of the present disclosure.

FIG. 4 shows a block diagram of a design of a base station/ eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 9A, and/or other processes for the techniques described herein. The processor 440 and/or other processors and modules at the eNodeB 110 may also perform or direct the execution of the functional blocks illustrated in FIG. 8A, and/or other processes for the techniques described herein. The memories 442 and 482 may store data and program codes for the base station 110 and the UE 120, respectively. A scheduler 444 may schedule UEs for data transmission on the downlink and/or uplink.

LTE-Advanced UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Figure 5A:
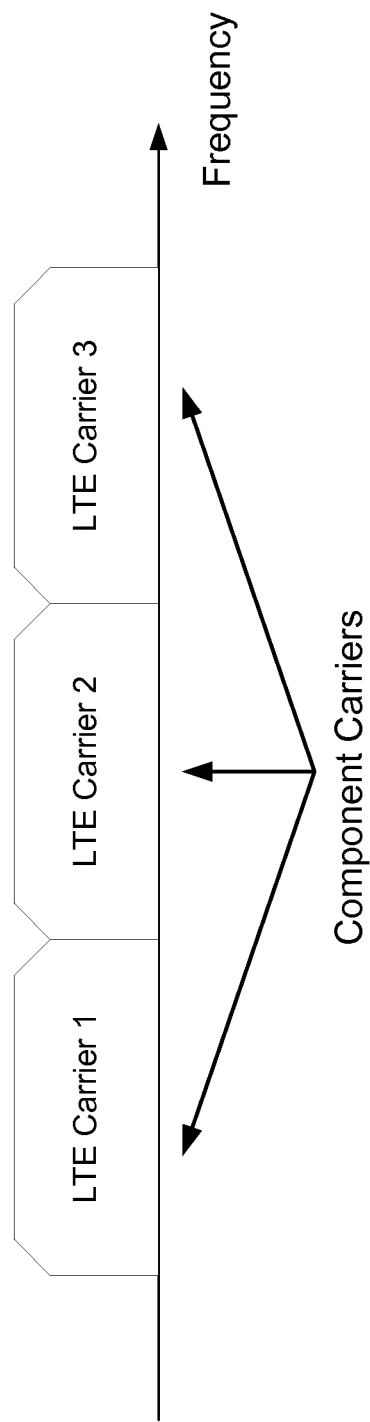
FIG. 5A discloses a continuous carrier aggregation type.
Figure 5B:
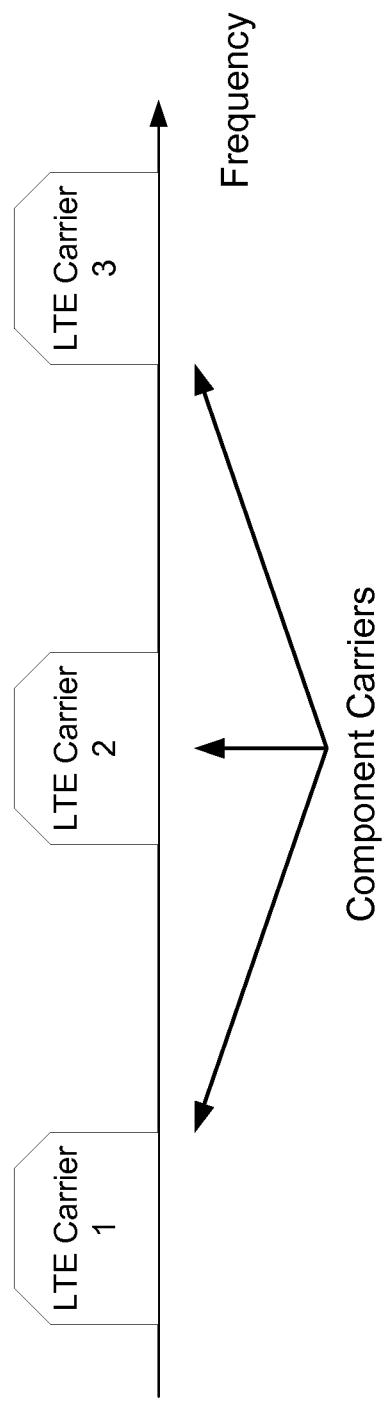
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 6:
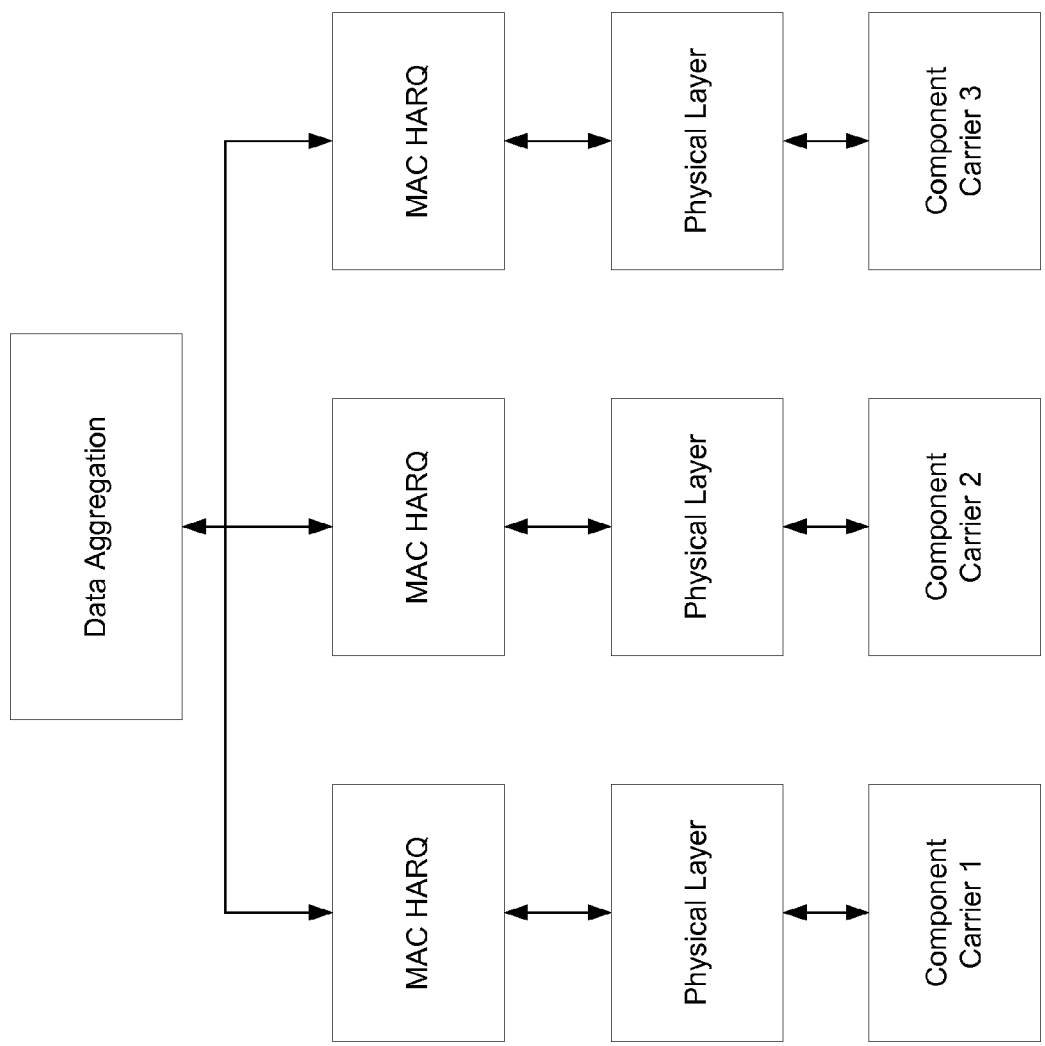
FIG. 6 discloses MAC layer data aggregation.

FIG. 6 illustrates aggregating transmission blocks (TBs) from different component carriers at the medium access control (MAC) layer (FIG. 6) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configurations) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier". The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 7:
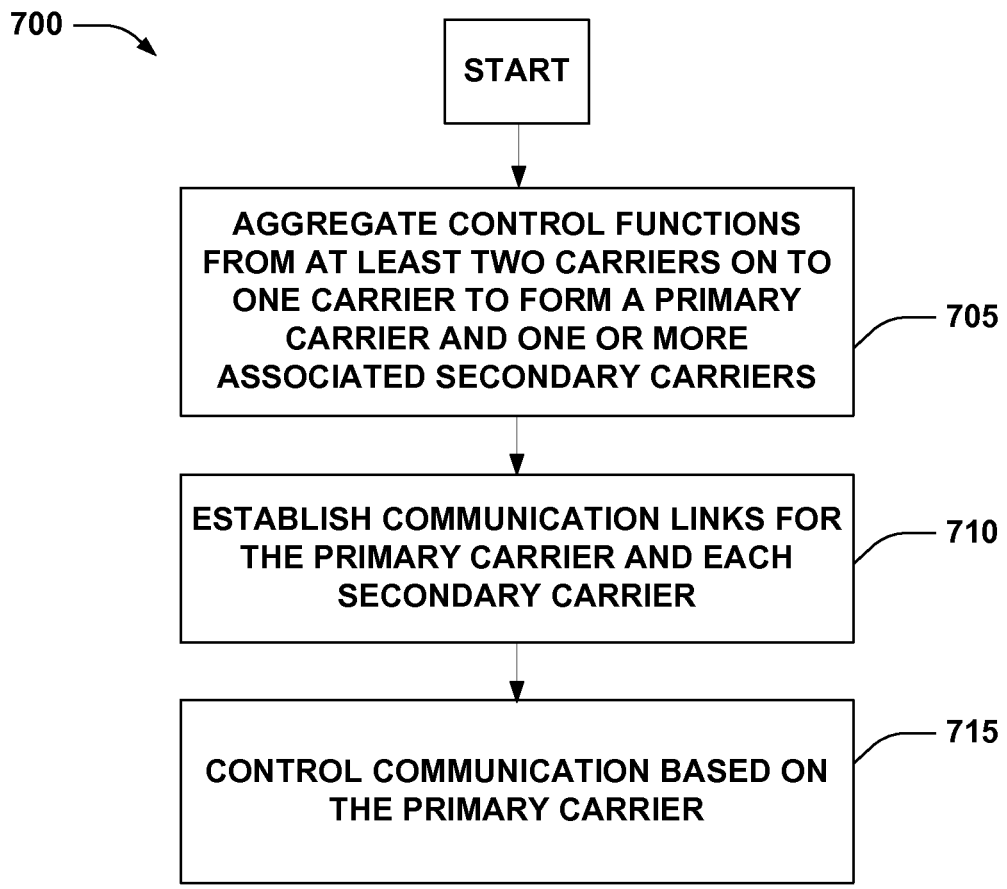
FIG. 7 is a block diagram illustrating a method for controlling radio links in multiple carrier configurations.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

Sharing Control Channel Resources

In LTE and LTE-advanced systems, physical downlink control channel (PDCCH) messages generally carry downlink control information for a UE 120 or a group of UEs 120. In one aspect, each PDCCH may be transmitted using one or more control channel resources. The control channel resources may be control channel elements (CCEs), where each CCE may correspond to sets of physical resource elements known as Resource Element Groups (REGs). In one example, nine sets of four physical resource elements known as resource element groups (REGs) make up each CCE. In general, several PDCCHs may be sent in a subframe.

Several PDCCH formats may be supported, each format having a designated number of CCEs (n), a number of REGs, and a number of PDCCH bits. Table 1 shows four PDCCH formats, which may be supported. For example, for PDCCH format 2, the number of CCEs is 4, the number of REGs is 36, and the number of PDCCH bits is 288.

TABLE 1

Formats for PDCCH

| Form at | CCEs | REGs | PDCCH Bits |
|---|---|---|---|
| 0 | 1 | 9 | 72 |
| 1 | 2 | 18 | 144 |
| 2 | 4 | 36 | 288 |
| 3 | 8 | 72 | 576 |

In Long Term Evolution (LTE) Release-8, each user equipment (UE) may monitor both a common search space and a UE-specific search space in a control region. Dedicated and common search spaces are generally defined as the set of CCE locations in which a UE may find its PDCCH. A dedicated, or ("UE-specific"), search space is configured for each UE individually, whereas all UEs are informed of the bounds of the common search space. Dedicated and common search spaces may overlap for any given UE. In the common search space, the number of CCEs for the PDCCH may be either four CCEs or eight CCEs. In a dedicated search space, the number of CCEs for the PDCCH depends on an aggregation size and may be exactly two, four or eight CCEs. An eNodeB will use channel conditions to decide how many CCEs to use for transmitting a particular PDCCH. If channel conditions are good, a small number of CCEs may be sufficient, while if channel conditions are bad up to eight CCEs may be required. In many cases, the number of CCEs for the PDCCH may be insufficient.

For example, in a system employing carrier aggregation, one component carrier (CC) may perform cross-carrier assignment for a different component carrier in the PDCCH region. Moreover, resources corresponding to a PDCCH for one component carrier may be shared for multiple component carriers. However, the number of symbols used for control signaling (e.g., PDCCH) may be limited. This may create a high block probability for PDCCH scheduling. Even in scenarios involving a single component carrier, when the number of users on a wireless network is large, PDCCH resources may become a bottleneck for performance because there is an insufficient number of PDCCHs in one subframe. Furthermore, Physical Downlink Shared Channel (PDSCH) signaling, such as random access responses from eNodeBs (such as a "MSG2"), paging messages, and system information block transmissions, relies upon a corresponding PDCCH to be sent over a common search space. In common search spaces where the minimum number of CCEs is 4, this may further cause a PDCCH shortage.

There is a need to increase PDCCH packing such that PDCCH resources are used more efficiently. According to one aspect, the CCE requirements defined in the standards are relaxed. In other words, the eNodeB may transmit the PDCCH with only a subset (N) of the specified set of control channel elements in a common search space. For example, in Release 8 of LTE, the number of CCEs for a PDCCH in the common search space is either 4 or 8. (There may also be RAN4 requirements for limiting the power variation within one symbol for CCEs.) In the present method and apparatus, the eNodeB 110 may transmit a subset N that may be 1, 2, or 3 when four CCEs are specified by the LTE standards. In the case when eight CCEs are designated, the eNodeB 110 may select any of 1-7 CCEs. Thus, for a given PDCCH, an eNodeB may choose not to schedule some of the control channel elements (CCEs) when the given PDCCH is scheduled for transmission in the common search space. For those control channel elements not transmitted in this PDCCH, i.e., unused CCEs, the eNodeB may use those control channel elements for transmission of a different PDCCH. In another aspect, the eNodeB transmits only a subset of Resource Element Groups (REGs) within a CCE. In this case, the unused REGs can be used for other PDCCHs. Transmitting the PDCCH with fewer CCEs or REGs may still accommodate the information to be transmitted because of the coding redundancy within the PDCCH. When channel conditions are good, fewer CCEs/REGs may also be able to accommodate the information to be transmitted.

The requirement relaxation also applies to efficient PDCCH transmission in UE specific search spaces. In this aspect, the eNodeB 110 may choose to transmit the PDCCH with only a subset of a specified set of control channel elements (CCEs) in a dedicated (or "UE-specific") search space. In other words, the eNodeB 110 may use a subset M of a set of control channel elements (CCEs) rather than all of the CCEs specified in the standards for a certain aggregation size. In one aspect, the subset M of CCEs for an aggregation size of two is a subset of one or two CCEs and not just the two CCEs specified in Release 8 of the LTE standard. The subset M of CCEs for an aggregation size of four is a subset of one, two, three or four CCEs and not just the four CCEs specified in Release 8 of the LTE standard. The subset M of CCEs for an aggregation size of eight is a subset of one, two, three, four, five, six, seven or eight CCEs and not just the eight CCEs specified in Release 8 of the LTE standard. As with the common search space, the unused CCEs in the dedicated search space can be scheduled by the eNodeB for other PDCCHs. In another aspect, the eNodeB transmits the PDDCH in a subset of aggregation size specified Resource Element Groups (REGs) for one CCE in the dedicated search space. In this case, the unused REGs are available for other PDCCHs.

Figure 8:
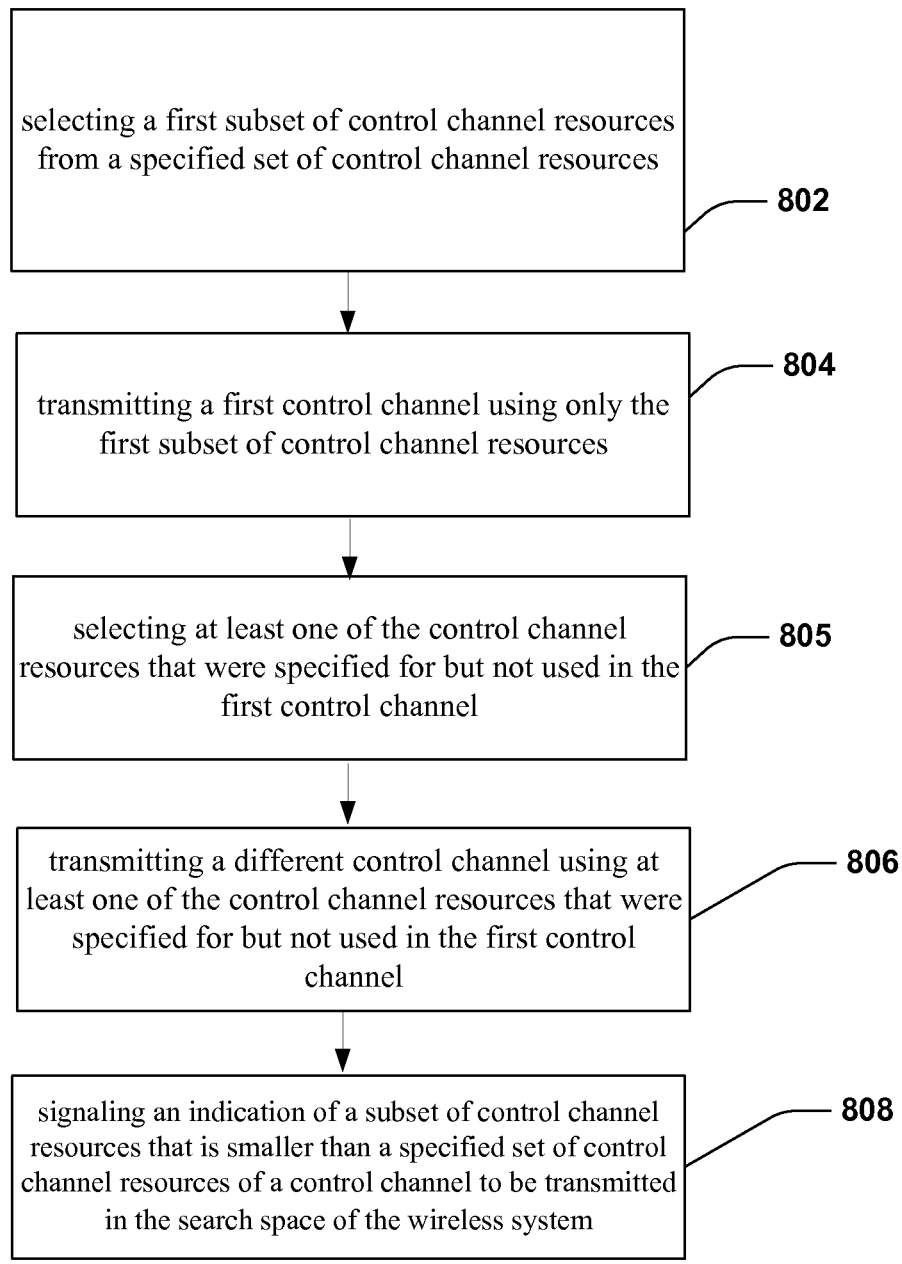
FIG. 8 illustrates an example operation that may be performed by an eNodeB in accordance with certain aspects of the present disclosure.

FIG. 8 illustrates an example operation that may be performed by an eNodeB, which advantageously uses PDCCH resources more efficiently by increasing PDCCH packing capability. At block 802, the eNodeB may select a first subset or a first group of control channel resources from a predefined set of control channel resources in a (common or dedicated) search space associated with the wireless system. In some aspects of the disclosure, the control channel resources are control channel elements (CCEs). In other aspects, the control channel resources are resource element groups (REGs) within a CCE. At block 804, the eNodeB 110 may transmit a first control channel (e.g., PDCCH) using only the first subset of control channel resources. That is, some of the predefined set (i.e., number of control channel resources specified in the standards) are not scheduled for the first control channel. At block 805, the eNodeB 110 may select at least one of the control channel resources that were specified for, but not used, in the first control channel. At block 806, the eNodeB may transmit a different control channel (e.g., PDCCH) using at least some of the control channel resources that were specified for, but not scheduled in, the first control channel. According to one aspect, the eNodeB 110 may signal to a UE 120 an indication of a subset of control channel resources that is smaller than a specified set of control channel resources of a control channel to be transmitted in the search space of the wireless system at block 808.

In one configuration, the eNodeB 110 is configured for wireless communication including a means for selecting a first subset of control channel resources from a predefined set of control channel resources. In one aspect, the selecting means may be the scheduler 444, and or/controller processor 440 configured to perform the functions recited by the selecting means. The eNodeB 110 is also configured to include a means for transmitting a first control channel message using only the first subset of control channel resources. In one aspect, the transmitting means may be the controller/processor 440, transmit processor 420, modulators 432a-t and antenna 434a-t configured to perform the functions recited by the transmitting means. The eNodeB 110 is configured for wireless communication including a means for selecting specified but unused resources. In one aspect, the selecting means may be the scheduler 444, and or/controller processor 440 configured to perform the functions recited by the selecting means. The eNodeB 110 is also configured to include a means for transmitting a different control channel message. In one aspect, the transmitting means may be the controller processor 440, transmit processor 420, modulators 432a-t and antenna 434a-t configured to perform the functions recited by the transmitting means. In another aspect, the aforementioned means may be any module or any apparatus configured to perform the functions recited by the aforementioned means.

Although the UE 120 could search to locate the reduced number of PDCCH CCEs/REGs in the usual manner prescribed by the standards, according to certain aspects, the UE 120 may be configured to receive PDCCH information indicating a partition of the CCEs or REGs within a CCE. Thus, the UE can skip unused CCEs/REGs. The UE 120 may process this received information to more accurately decode the PDCCH because some part of the predefined PDCCH may contain resources for a different UE. That is, in LTE Rel-8/9, predefined CCEs or REGs are assigned to each PDCCH, but in this example, some of those CCEs/REGs are allocated to a different PDCCH.

Figure 9:
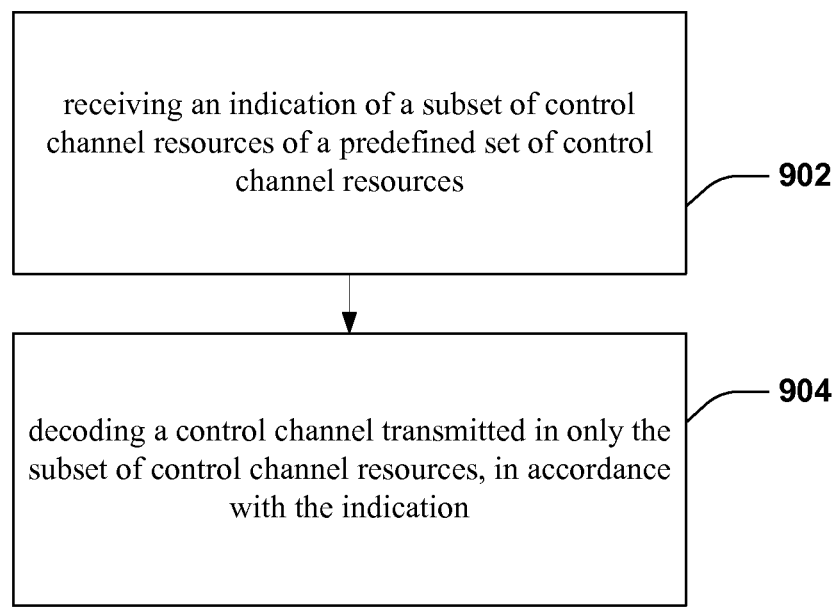
FIG. 9 illustrates an example operation that may be performed by a UE in accordance with certain aspects of the disclosure.

FIG. 9 illustrates an example operation that may be performed by a UE 120 in accordance with certain aspects of the disclosure. At block 902, the UE 120 may receive an indication of a subset of control channel resources of a predefined set of control channel resources in a (common or dedicated) search space associated with the wireless system. According to one aspect, an eNodeB may signal to the UE 120 an indication of the groups of CCEs or REGs used for each PDCCH. At block 904, the UE 120 may decode a control channel (e.g., PDCCH) transmitted in only the subset of control channel resources, in accordance with the indication. For example, the UE 120 would ignore control channel resources normally associated with the control channel, but which are actually scheduled for other UEs 120, based on the received signaling.

In one configuration, the UE 120 is configured for wireless communication including a means for receiving an indication of a subset of control channel resources of a predefined set of control channel resources. In one aspect, the receiving means may be the controller/processor 480, memory 482, receive processor 458, demodulators 454a-r and antenna 452a-r configured to perform the functions recited by the receiving means. The UE 120 is also configured to include a means for decoding a control channel transmitted in only the subset of control channel resources, in accordance with the indication. In one aspect, the decoding means may be the controller/processor 480, and memory 482 configured to perform the functions recited by the decoding means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for reusing control channel resources in a wireless system, comprising:
    selecting a set of control channel resources from available control channel resources in a search space of the wireless system, the set of control channel resources being selected to transmit a first control channel, and the set of control channel resources being based at least in part on an aggregation size;
    transmitting a first control channel using only a first subset of the set of control channel resources, the first subset being less than the set;
    selecting a second subset from the set of control channel resources, the second subset not being used for transmitting the first control channel; and
    transmitting a second control channel using the second subset, the first control channel being different from the second control channel.

2. The method of claim 1, wherein the search space comprises a common search space.

3. The method of claim 2, wherein the control channel resources comprise control channel elements (CCEs).

4. The method of claim 2, wherein the control channel resources comprise resource element groups (REGs) of a control channel element (CCE).

5. The method of claim 1, wherein the search space comprises a user equipment (UE) specific search space.

6. The method of claim 5, wherein the control channel resources comprise control channel elements (CCEs).

7. The method of claim 5, wherein the control channel resources comprise resource element groups (REGs) of a control channel element (CCE).

8. The method of claim 1, further comprising:
    signaling partition information indicating the first subset.

9. The method of claim 1, wherein the first and second control channels are physical downlink control channels (PDCCHs).

10. The method of claim 1, in which the first subset is selected based at least in part on channel conditions between an eNodeB and a user equipment (UE).

11. A method for reusing control channel resources in a wireless system, comprising:
    receiving an indication of a first subset of control channel resources for a first control channel and a second subset of control channel resources for a second control channel to be transmitted in a search space for the wireless system,
    the first subset and the second subset being selected from a set of control channel resources allocated to the first control channel, the first subset being less than a set of control channel resources, the set of control channel resources being based at least in part on an aggregation size, the second subset selected from the set of control channel resources for the transmission of the second control channel is different from the first subset of control channel resources for the transmission of the first control channel, the second subset not being used for transmitting the first control channel; and decoding the first control channel transmitted with the first subset of control channel resources, the first control channel being decoded in accordance with the indication.

12. The method of claim 11, wherein the search space comprises a common search space.

13. The method of claim 12, wherein the control channel resources comprise control channel elements (CCEs).

14. The method of claim 12, wherein the control channel resources comprise resource element groups (REGs) of a control channel element (CCE).

15. The method of claim 11, wherein the search space comprises a user equipment (UE) specific search space.

16. The method of claim 15, wherein the control channel resources comprise control channel elements (CCEs).

17. The method of claim 15, wherein the control channel resources comprise resource element groups (REGs) of a control channel element (CCE).

18. An apparatus for reusing control channel resources in a wireless system, comprising:
    means for selecting a set of control channel resources from available control channel resources in a search space of the wireless system, the set of control channel resources being selected to transmit a first control channel, and the set of control channel resources being based at least in part on an aggregation size;
    means for transmitting a first control channel using only a first subset of the set of control channel resources, the first subset being less than the set;
    means for selecting a second subset of the set of control channel resources not used for transmitting the first control channel; and
    means for transmitting a second control channel using the second subset, the first control channel being different from the second control channel.

19. The apparatus of claim 18, wherein the search space comprises a common search space.

20. The apparatus of claim 19, wherein the control channel resources comprise control channel elements (CCEs).

21. The apparatus of claim 19, wherein the control channel resources comprise resource element groups (REGs) of a control channel element (CCE).

22. The apparatus of claim 18, wherein the search space comprises a user equipment (UE) specific search space.

23. The apparatus of claim 22, wherein the control channel resources comprise control channel elements (CCEs).

24. The apparatus of claim 22, wherein the control channel resources comprise resource element groups (REGs) of a control channel element (CCE).

25. The apparatus of claim 18, further comprising:
    means for signaling partition information indicating the first subset.

26. The apparatus of claim 18, wherein the first control channel and the second control channel are physical downlink control channels (PDCCHs).

27. An apparatus for reusing control channel resources in a wireless system, comprising:
    means for receiving an indication of a first subset of control channel resources for a first control channel to be transmitted in a search space of the wireless system, the first subset being less than a set of control channel resources, the set of control channel resources being based at least in part on an aggregation size, a second subset from the set of control channel resources being allocated to a second control channel that is different from the first control channel, and the second subset not being used for transmitting the first control channel; and
    means for decoding the first control channel transmitted with the first subset of control channel resources, the first control channel being decoded in accordance with the indication.

28. The apparatus of claim 27, wherein the search space comprises a common search space.

29. The apparatus of claim 28, wherein the control channel resources comprise control channel elements (CCEs).

30. The apparatus of claim 28, wherein the control channel resources comprise resource element groups (REGs) of a control channel element (CCE).

31. The apparatus of claim 27, wherein the search space comprises a user equipment (UE) specific search space.

32. The apparatus of claim 31, wherein the control channel resources comprise control channel elements (CCEs).

33. The apparatus of claim 31, wherein the control channel resources comprise resource element groups (REGs) of a control channel element (CCE).

34. A computer program product for reusing control channel resources in a wireless system, comprising:
    a computer-readable medium having non-transitory program code recorded thereon, the program code comprising:
        program code to select a set of control channel resources from available control channel resources in a search space of the wireless system, the set of control channel resources being selected to transmit a first control channel, and the set of control channel resources being based at least in part on an aggregation size;
        program code to transmit a first control channel using only a first subset of the set of control channel resources, the first subset being less than the set;
        program code to a second subset from the set of control channel resources, the second subset not being used for transmitting the first control channel; and
        program code to transmit a second control channel using the second subset, the first control channel being different from the second control channel.

35. A computer program product for reusing control channel resources in a wireless system, comprising:
    a computer-readable medium having non-transitory program code recorded thereon, the program code comprising:
        program code to receive an indication of a first subset of control channel resources for a first control channel to be transmitted in a search space of the wireless system, the first subset being less than a set of control channel resources, the set of control channel resources being based at least in part on an aggregation size, a second subset from the set of control channel resources being allocated to a second control channel that is different from the first control channel, and the second subset not being used for transmitting the first control channel; and
        program code to decode the first control channel transmitted with the first subset of control channel resources, the first control channel being decoded in accordance with the indication.

36. An apparatus to reuse control channel resources in a wireless system, comprising:
a memory; and
at least one processor coupled to the memory, the at least one processor adapted to:
select a set of control channel resources from available control channel resources in a search space of the wireless system, the set of control channel resources being selected to transmit a first control channel, and the set of control channel resources being based at least in part on an aggregation size;
transmit a first control channel using only a first subset of the set of control channel resources, the first subset being less than the set;
select a second subset from the set of control channel resources, the second subset not being used for transmitting the first control channel; and
transmit a second control channel using the second subset, the first control channel being different from the second control channel.

37. The apparatus of claim 36, wherein the search space comprises a common search space.

38. The method of claim 37, wherein the control channel resources comprise control channel elements (CCEs).

39. The apparatus of claim 37, wherein the control channel resources comprise resource element groups (REGs) of a control channel element (CCE).

40. The apparatus of claim 36, wherein the processor is further adapted to:
signal partition information indicating the first subset.

41. The apparatus of claim 36, wherein the search space comprises a user equipment (UE) specific search space.

42. The apparatus of claim 41, wherein the control channel resources comprise control channel elements (CCEs).

43. The apparatus of claim 41, wherein the control channel resources comprise resource element groups (REGs) of a control channel element (CCE).

44. The apparatus of claim 36, wherein the first control channel and the second control channel are physical downlink control channels (PDCCHs).

45. An apparatus to reuse control channel resources in a wireless system, comprising:
a memory; and
at least one processor coupled to the memory, the at least one processor adapted to:
receive an indication of a first subset of control channel resources for a first control channel to be transmitted in a search space of the wireless system, the first subset being less than a set of control channel resources, the set of control channel resources being based at least in part on an aggregation size, a second subset from the set of control channel resources being allocated to a second control channel that is different from the first control channel, and the second subset not being used for transmitting the first control channel; and
decode the first control channel transmitted with the first subset of control channel resources, the first control channel being decoded in accordance with the indication.

46. The apparatus of claim 45, wherein the search space comprises a common search space.

47. The apparatus of claim 46, wherein the control channel resources comprise control channel elements (CCEs).

48. The apparatus of claim 46, wherein the control channel resources comprise resource element groups (REGs) of a control channel element (CCE).

49. The apparatus of claim 45, wherein the search space comprises a user equipment (UE) specific search space.

50. The apparatus of claim 49, wherein the control channel resources comprise control channel elements (CCEs).

51. The apparatus of claim 49, wherein the control channel resources comprise resource element groups (REGs) of a control channel element (CCE).

* * * * *